(12) United States Patent
Clayton et al.

(10) Patent No.: US 9,213,752 B2
(45) Date of Patent: *Dec. 15, 2015

(54) ASYNCHRONOUS PAUSING OF THE FORMATION OF CONSISTENCY GROUPS

(71) Applicant: International Business Machines Corporation, Armonk, NY (US)

(72) Inventors: Nicolas M. Clayton, Warrington (GB); Joshua J. Crawford, Tuscon, AZ (US); Theodore T. Harris, Tuscon, AZ (US); Carol S. Mellgren, Tucson, AZ (US); Gail A. Spear, Tucson, AZ (US); Matthew J. Ward, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/072,727

(22) Filed: Nov. 5, 2013

(65) Prior Publication Data

US 2014/0229434 A1 Aug. 14, 2014

Related U.S. Application Data

(63) Continuation of application No. 13/765,632, filed on Feb. 12, 2013.

(51) Int. Cl.
*G06F 3/06* (2006.01)
*G06F 17/30* (2006.01)
*G06F 11/20* (2006.01)

(52) U.S. Cl.
CPC ........ *G06F 17/30578* (2013.01); *G06F 3/0604* (2013.01); *G06F 3/065* (2013.01); *G06F 3/067* (2013.01); *G06F 11/2064* (2013.01)

(58) Field of Classification Search
CPC .............. G06F 17/30578; G06F 3/065; G06F 11/2064; G06F 3/0604; G06F 3/067
USPC .......... 711/162, 112, 114, 156; 707/615, 645, 707/649
See application file for complete search history.

(56) References Cited

U.S. PATENT DOCUMENTS 6,484,187 B1 11/2002 Kern et al.
7,089,446 B2 8/2006 Boyd et al.
(Continued)

OTHER PUBLICATIONS

Response dated Dec. 11, 2014, pp. 9, to Office Action dated Sep. 11, 2014, pp. 9, for U.S. Appl. No. 13/765,632 filed Feb. 12, 2013, Clayton et al.

(Continued)

*Primary Examiner* — Stephen Elmore
(74) *Attorney, Agent, or Firm* — David W. Victor; Konrad Raynes Davda & Victor LLP

(57) ABSTRACT

Provided are a computer program product, system, and method for asynchronous pausing of the formation of consistency groups. A first copy operation is initiated to copy the source data from the first storage to the first data copy in the second storage. A second copy operation is initiated to copy the first data copy in the second storage to a second data copy in response to forming a consistency group of the source data at the first data copy forms consistent as of a point-in-time with respect to the source data. The first copy operation is suspended to allow for further processing of the first data copy in response to completing the second copy operation. The formation of a next consistency group is restarted between the source data and the first data copy in response to receiving a resume command.

8 Claims, 5 Drawing Sheets

(56) References Cited

U.S. PATENT DOCUMENTS

| | | |
|---|---|---|
| 7,133,982 B2 | 11/2006 | Werner et al. |
| 7,475,099 B2 | 1/2009 | Doatmas et al. |
| 7,536,523 B2 | 5/2009 | Yagawa et al. |
| 7,571,292 B2 | 8/2009 | McClure |
| 7,657,782 B2 | 2/2010 | Das et al. |
| 7,765,187 B2 | 7/2010 | Bergant et al. |
| 7,870,423 B2 | 1/2011 | Takahashi et al. |
| 8,027,951 B2 | 9/2011 | Doatmas et al. |
| 8,433,680 B2 | 4/2013 | Ling et al. |
| 8,433,866 B2 | 4/2013 | Inoue et al. |
| 8,548,949 B2 * | 10/2013 | Jennas et al. ................... 707/649 |
| 8,554,737 B2 * | 10/2013 | Jennas et al. ................... 707/649 |
| 8,825,603 B2 | 9/2014 | Harris et al. |
| 9,063,997 B2 | 6/2015 | Clayton et al. |
| 2004/0260896 A1 | 12/2004 | Werner et al. |
| 2007/0233981 A1 | 10/2007 | Arakawa et al. |
| 2014/0108750 A1 | 4/2014 | Brown et al. |
| 2014/0108751 A1 | 4/2014 | Brown et al. |
| 2014/0108752 A1 | 4/2014 | Brown et al. |
| 2014/0195751 A1 | 7/2014 | Lahousse et al. |

OTHER PUBLICATIONS

Notice of Allowance dated Feb. 17, 2015, pp. 12, for U.S. Appl. No. 13/765,632 filed Feb. 12, 2013, Clayton et al.

U.S. Appl. No. 13/765,632, filed Feb. 12, 2013, entitled "Asynchronous Pausing of the Formation of Consistency Groups", invented by N.M. Clayton et al., 27 pp. [18.476 (Appln)].

Office Action dated Sep. 11, 2014, pp. 9, for U.S. Appl. No. 13/765,632 filed Feb. 12, 2013, Clayton et al.

Office Action dated Jul. 6, 2015, pp. 17, for U.S. Appl. No. 14/701,504 filed Apr. 30, 2015.

Response dated Oct. 6, 2015, pp. 11, to Office Action dated Jul. 6, 2015, pp. 17, for U.S. Appl. No. 14/701,504 filed Apr. 30, 2015.

Notice of Allowance dated Oct. 27, 2015, pp. 11, for U.S. Appl. No. 14/701,504 filed Apr. 30, 2015.

* cited by examiner

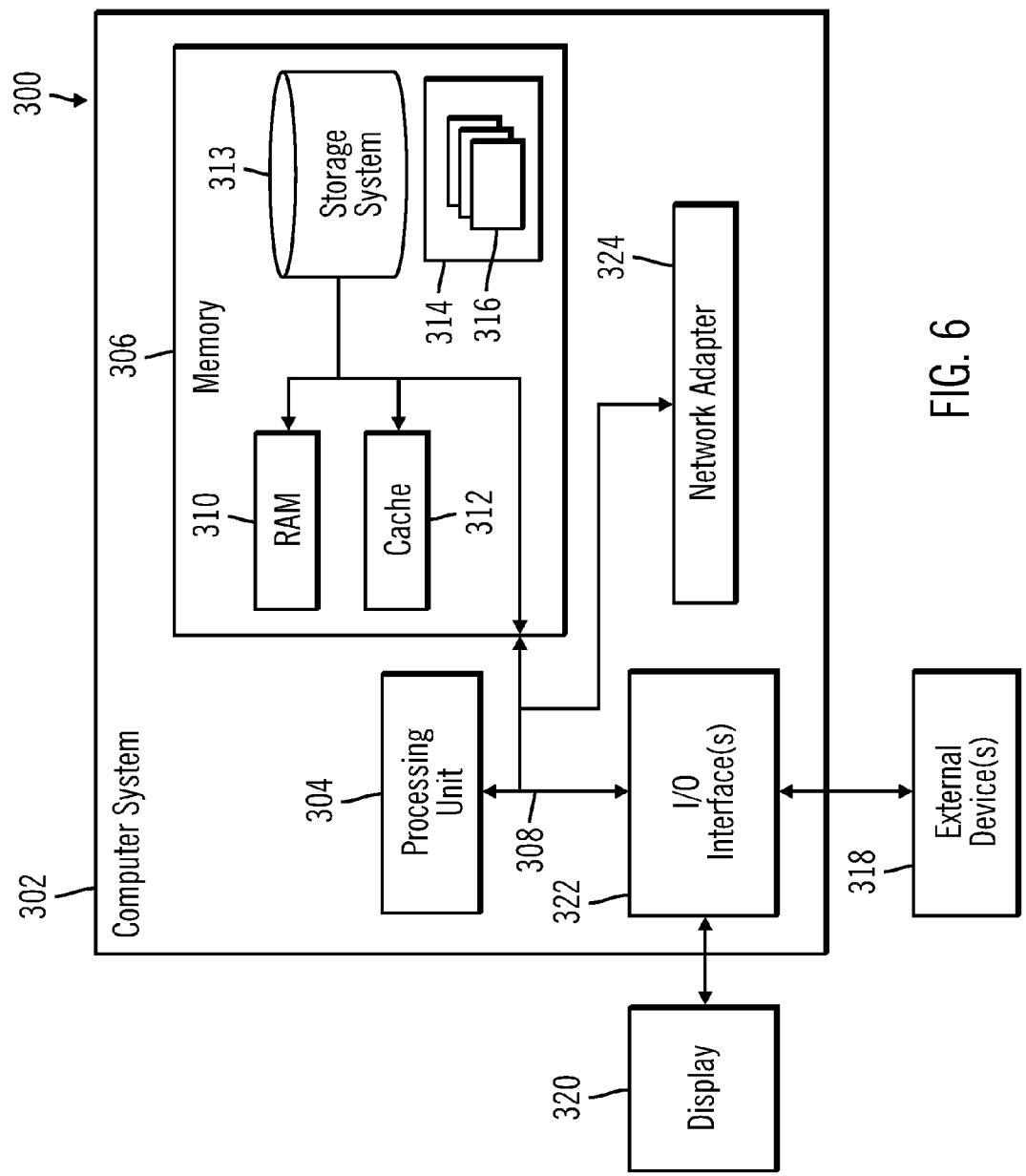

US 9,213,752 B2

ASYNCHRONOUS PAUSING OF THE FORMATION OF CONSISTENCY GROUPS

CROSS-REFERENCE TO RELATED APPLICATION

This application is a continuation of U.S. patent application Ser. No. 13/765,632, filed Feb. 12, 2013, which application is incorporated herein by reference in its entirety.

BACKGROUND OF THE INVENTION

1. Field of the Invention

The present invention relates to a computer program product, system, and method for asynchronous pausing of the formation of consistency groups 2. Description of the Related Art In a storage environment, production volumes at a primary storage site may be copied to volumes in a secondary storage site to provide redundant copies of data. In the International Business Machine Corporation's ("IBM") Global Mirror, data is asynchronously copied from the primary storage site to the secondary storage site. Data may be copied in consistency groups, such that copied data is consistent as of a point-in-time to a first copy of the data at the secondary site. In a consistency group, the order of dependent writes is preserved in the copying of the data.

The target data, or first copy, at the secondary site, to which the source data at the primary storage site is copied, may be copied to a second copy of the data at the secondary site using a point-in-time ("PiT") copy techniques, such as the IBM FlashCopy® (FlashCopy is a registered trademark of IBM) In this way the target data (first copy) in the copy relationship with the source data at the primary site becomes the source data for the PiT copy to the second copy. In other implementations, such as IBM Global Copy, the second copy may be in a third site.

Customers that want to create additional copies of the target data at the secondary site, may perform a fast reverse restore operation, where replication from the primary to the secondary site is suspended and a reverse FlashCopy is made from the second copy back to the first copy, wiping out any newer data received at the first copy since the point-in-time of the second copy. After the reverse FlashCopy is made back to the first data copy, the customer may then make additional copies from the reversed first data copy.

SUMMARY

Provided are a computer program product, system, and method for asynchronous pausing of the formation of consistency groups. A first copy operation is initiated to copy source data from a first storage to a first data copy in a second storage. A second copy operation is initiated to copy the first data copy in the second storage to a second data copy in response to forming a consistency group of the source data at the first data copy forms consistent as of a point-in-time with respect to the source data. The first copy operation is suspended to allow for further processing of the first data copy in response to completing the second copy operation. The formation of a next consistency group is restarted between the source data and the first data copy in response to receiving a resume command.

BRIEF DESCRIPTION OF THE DRAWINGS

FIG. 6 illustrates a computing environment in which the components of FIG. 1 maybe implemented.

DETAILED DESCRIPTION

Described embodiments provide techniques for processing a pause with consistency command that allows a host to pause the formation of consistency group to allow a program or customer at the host to create additional copies of the target copy of the source data at the secondary site. Once the customer has completed creating the additional copies, the replication of the data from the source data to the target data may continue to form additional consistency groups. This allows a host to pause the formation of consistency groups at a point where the target data is consistent as of a point-in-time.

Figure 1:
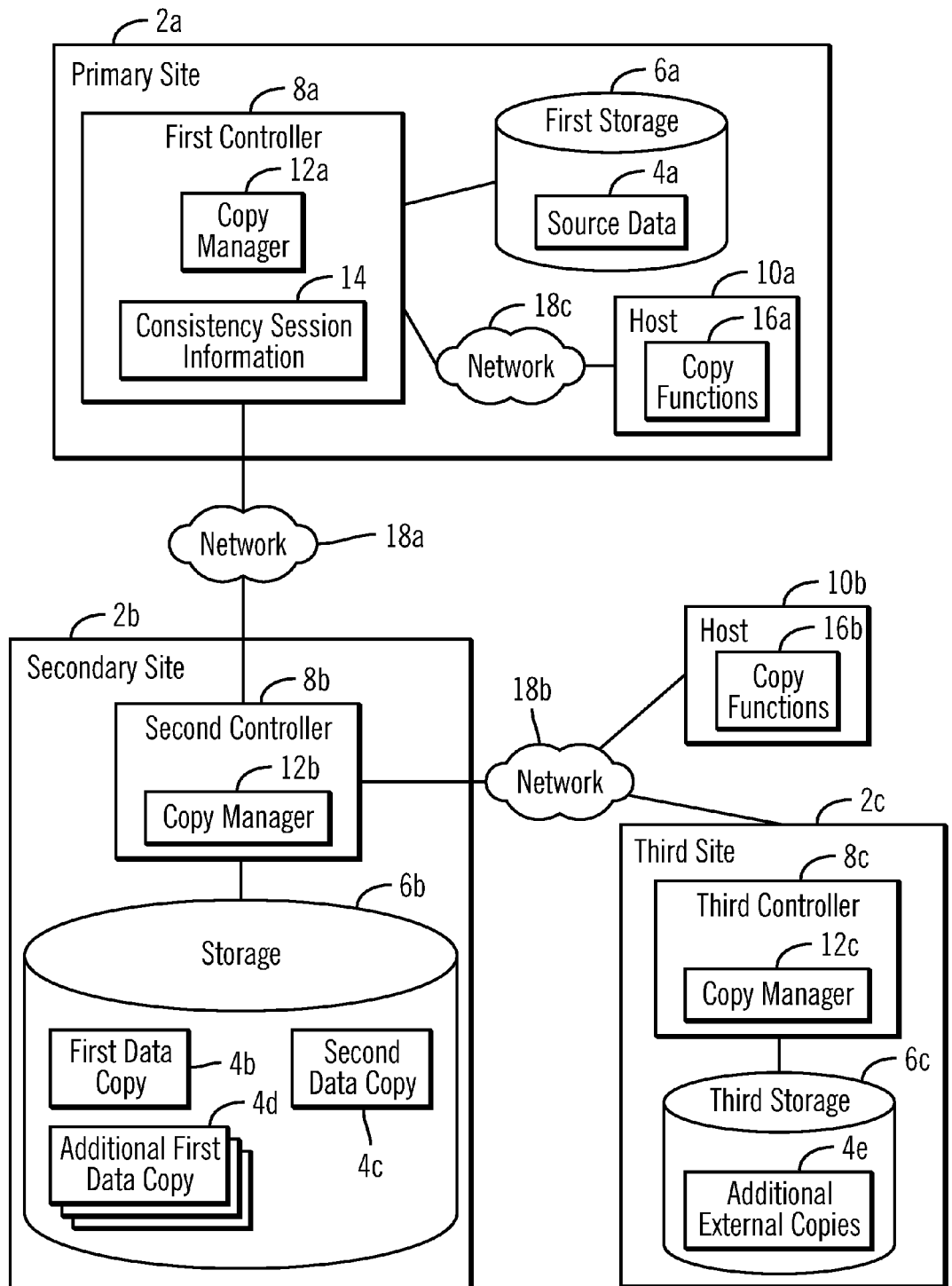
FIG. 1 illustrates an embodiment of a storage replication environment.

FIG. 1 illustrates an embodiment of a data replication environment having a primary site 2a, a secondary site 2b, and a third site 2c. Source data 4a maintained in a first storage 6a in the primary site 2a may be replicated to a target first data copy 4b in a second storage 6b using a first copy operation, where data is synchronized to a second data copy 4c. The first data copy 6b in the second storage 4b may be copied to a second data copy 4c in the second storage 6b as part of a second copy operation, such as a point-in-time ("PiT") copy operation, e.g., FlashCopy, snapshot, etc. Further, one or more additional first data copies 4d may be made from the first data copy 4b in the manner described below in the second storage 6b and to additional external copies 4e at a third storage 6c at the third site 2c. The data 4a, 4b, 4c, 4d, 4e may comprise volumes or other units of data. The first copy operation may be part of a consistency session where data is replicated from the source data 4a to the first data copy 4b in consistency groups consistent as of a point-in-time.

A PiT copy operation replicates data in a manner that appears instantaneous and allows a process to continue accessing the source volume while actual data transfers to the copy volume are deferred to a later time. The point-in-time copy appears instantaneous because complete is returned to the copy operation in response to generating the relationship data structures without copying the data.

The sites 2a, 2b, 2c may further include first 8a, second 8b, and third 8c controllers to manage Input/Output (I/O) access to the corresponding storages 6a, 6b, and 6c. Hosts 10a, 10b, which may be located within the sites 2a, 2b, 2c or external thereto may initiate consistency sessions to copy source data 4a to a first data copy 4b and further make a PiT copy of the first data copy 4b to the second data copy 4c as well as to additional data copies 4d, 4e. The hosts 10a, 10b may further initiate I/O requests against the data 4a, 4b, 4c, 4d, 4e.

The controllers 8a, 8b, 8c may include a copy managers 12a, 12b, 12c, respectively, to manage the copy operations of the source data 4a to the first 4b and second 4b data copies between the storages 6a, 6b, 6c. The copy manager 12a maintains consistency session information 14 having information about volumes or data sets for which consistency groups are being formed of the source data 4a at the first data copy 4b and second data copy 4c as part of a consistency session. A consistency group comprises a copy of the data that is consistent as of a point-in-time, such that data is copied in a manner to maintain consistency across all dependent data, so that the order of dependent writes is preserved to make the data consistent as of the point-in-time of the consistency group.

In an alternative embodiment, the second data copy 4c may be at the third storage site 2c. Further, the copy manager 12b may switch to synchronous copy and suspend the data copy process to the second data copy 4c to make the sure the data reaches the second data copy 4c and is not modified.

The storages 6a, 6b, 6c may store tracks in a Redundant Array of Independent Disks (RAID) configuration where strides of tracks are written across multiple storage devices comprising the storages 6a, 6b, 6c. The storages 6a, 6b, 6c may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

The network(s) 18a, 18b, 18c may comprise a network such as one or more interconnected Local Area Networks (LAN), Storage Area Networks (SAN), Wide Area Network (WAN), peer-to-peer network, wireless network, etc. Further the network 18a, 18b, 18c may be further implemented in additional networks.

Figure 2:
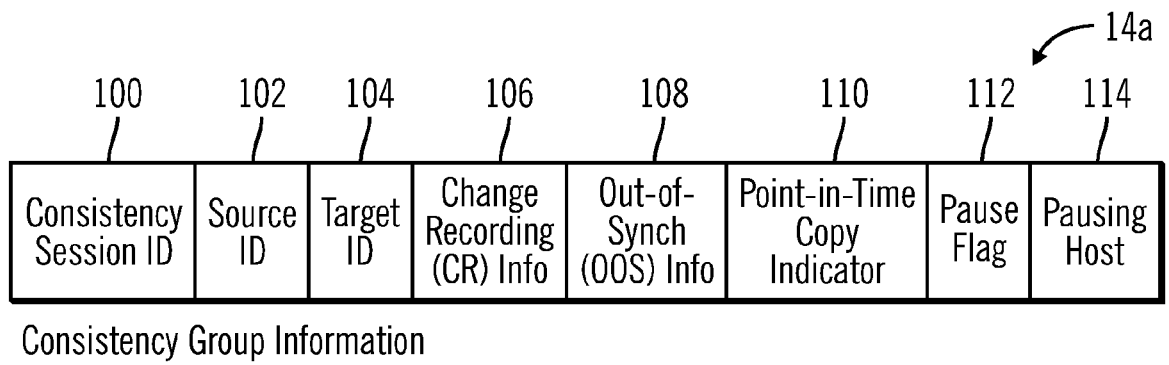
FIG. 2 illustrates an embodiment of consistency session information.

FIG. 2 illustrates an instance of consistency session information 14a included in the consistency session information 14 maintained for one consistency session, including a consistency session identifier (ID) 100, source identifier (ID) 102, such as the volume identifier, from which consistency groups are being formed for the consistency session; target ID 104, such as the target volume identifier, to which the source data, e.g., volume, is copied; change recording information 106, such as a bitmap, indicating updates to the source data 4a in the consistency session that occur while data is being copied from the source data 4a to the first data copy 4b; out-of-synch (OOS) information 108, such as a bitmap, indicating updates that occurred to the source data 4a that are to be copied to the first data copy 4b to form a next consistency group; a point-in-time copy indicator 110 indicating if a point in time copy of the target data at the target ID 104 is to be made to the second data copy 4b; a pause flag 112 indicating whether a host 10a, 10b has requested that the formation of consistency groups be paused while the host performs operations with respect to the first data copy 4b, such as creating additional data copies 4d, 4e, e.g., additional PiT copies; and a pausing host 114 indicating the host 10a, 10b that sent the pause with consistency command. The pausing host 114 information may include a callback function to notify the host when the copy manager 12a has satisfied the requested pause. The hosts 10a, 10b may create additional data copies 4d, 4e for testing or other purposes.

In one embodiment, the copy functions 16a, 16b are capable of issuing a pause with consistency command to instruct the copy manager 12a to pause the synchronization of source data 4 in a consistency session upon forming a consistency group between the source data 4a and the first data copy 4b so that the host 10a, 10b may make additional copies 4d, 4e, such as additional PiT copies, of the first data copy 4b at the time at which the last consistency group was formed. The pause with consistency command may indicate the consistency session, the host or process initiating the command, and other information used to process the command. The pause with consistency command causes the copy manager 12a to pause or cease forming the next consistency group, which could overwrite the consistency group completed at first data copy 4b that the host 10a, 10b wants to further process, such as making additional copies 4d, 4e or performing other operations with respect to the first data copy 4a. The pause with consistency command and subsequent additional copies 4d, 4e created after the consistency group formation is formed may be initiated by a customer at the host 10a, 10b or a process executing in the host 10a, 10b.

Figure 3:
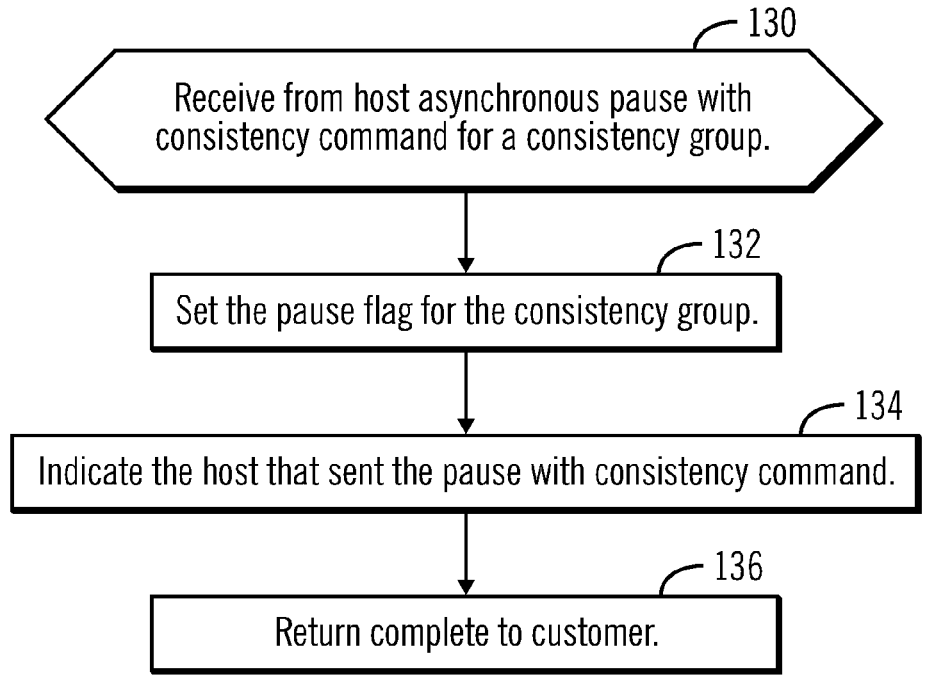
FIG. 3 illustrates an embodiment of operations to process a pause with consistency command.

FIG. 3 illustrates an embodiment of operations performed by the copy program 12a to process a pause with consistency command from one of the hosts 10a, 10b. Upon receiving (at block 130) a pause with consistency command for a consistency session, the copy manager 12a sets (at block 132) the pause flag 112 for the consistency group 100 (FIG. 2) specified in the pause with consistency command. The copy manager 12a indicates (at block 134) in the pausing host 114 information the host 10a, 10b that sent the pause with consistency command as indicated. The copy manager 14 returns (at block 136) complete to the host 10a, 10b or customer that sent the pause with consistency command to indicate the pause command was processed. The command may be received and the operations of FIG. 3 performed while the copy manager 12a is in progress of synchronizing data indicated in the OOS information 108 between the source data 4a and the target first data copy 4b.

Figure 4:
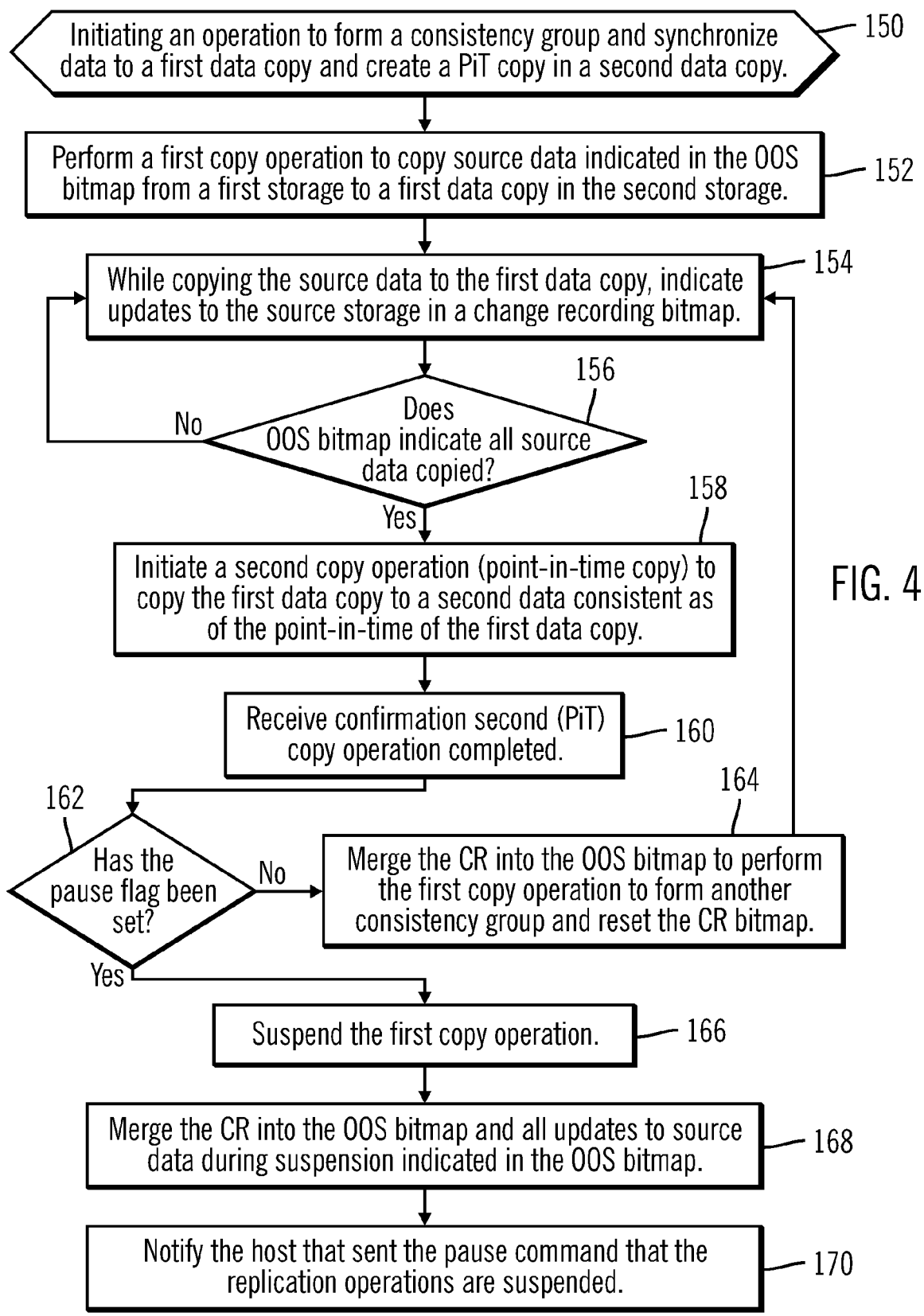
FIG. 4 illustrates an embodiment of operations to form a consistency group.

FIG. 4 illustrates an embodiment of operations performed by the copy manager 12a to copy the source data 4a to the first copy data 4b to synchronize the source data 4a at the secondary site 2a. Upon initiating (at block 150) an operation to form a consistency group, as part of a consistency session 14a, among the source data 4a and first data copy 4b and second data copy 4c, the copy manager 12a performs (at block 152) a first copy operation, such as a synchronization operation, to copy the source data 4a indicated in the OOS information 108 from the first storage 6a to the first data copy 4b in the second storage 6b. While copying the source data 4a to the first data copy 4b, the copy manager 12a indicates (at block 154) new updates to the source data 4a in the change recording information 106 for the consistency session 14a.

If (at block 156) the OOS information 108 indicates that there is further source data 4a to copy in the consistency group, then control proceeds back to block 154 to continuing copying the source data indicated in the OOS information 108 and indicate new updates in the change recording information 106. After all the source data 4a indicated in the OOS information 108 is copied, then the copy manager 12a initiates (at block 158) a second copy operation, e.g., a point-in-time copy, to copy the first data copy 4b to the second data 4c consistent as of the point-in-time of the first data copy 4a, to provide a PiT copy of the consistency group at second data copy 4b formed between the source data 4a and the first data copy 4b. The copy manager 12a may coordinate with copy manager 12b to perform the second copy operation.

Upon receiving (at block 160) from the copy manager 12b confirmation that the second (PiT) copy operation of the second data copy 4c completed, if (at block 162) the pause flag 112 is not set to indicate to pause forming consistency groups, then the copy manager 12a merges (at block 164) the change recording information 106 into the OOS information 108 and then restarts the first copy operation to form another consistency group. The change recording information 106 may be reset. If (at block 162) the pause flag 112 is set to indicate pause, then the copy manager 12a suspends (at block 166) performing the first copy operation to form another consistency group between the source data 4a and the first data copy 4b. The change recording information 106 may be merged (at block 168) into the OOS information 108 for the next consistency group and during the suspend any new updates are indicated in the OOS information 108 so they will be included in the consistency group formed after the suspend is removed. The copy manager 12a may notify (at block 170) the host 10a, 10b that sent the pause with consistency command that replication operations are suspended between the source data 4a and first data copy 4b. Upon receiving the notification of the pause, the customer or program at the host 10a, 10b that sent the pause command may then begin making copies of the first data copy 4b, such as the additional data copies 4d and the additional external copies 4e at the third site 2c, or performing other operations with respect to the first data copy 4b.

Although the second copy operations of FIG. 4 were described with respect to a PiT copy operation, the second copy operation to the second data copy 4c comprise a different type of copy operation than a PiT copy, such as a full copy of all the data.

Figure 5:
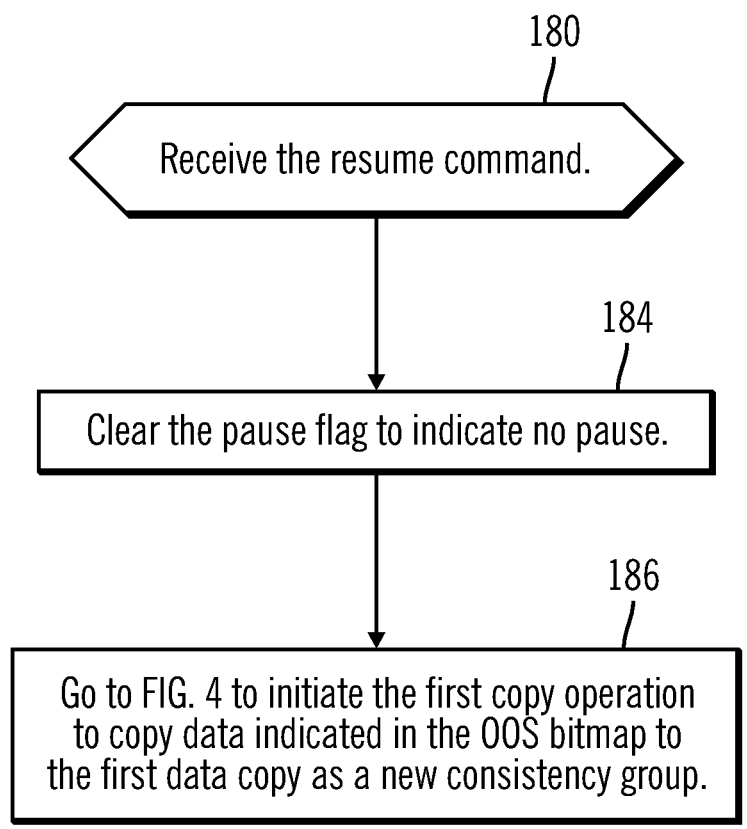
FIG. 5 illustrates an embodiment of operation to process a resume command.

FIG. 5 illustrates an embodiment of operations performed by the copy manager 12a upon receiving the resume command from a host 10a, 10b that initiated the pause with consistency command while the consistency session is paused. The host 10a, 10b may issue the resume command after completing forming additional copies 4d, 4e from the first data copy 4b. Upon receiving (at block 180) the resume command, the copy manager 12a clears (at block 184) the pause flag 112 to indicate there is no pausing and executes (at block 186) the operations of FIG. 4 to form a next consistency group from the source data 4a indicated in the OOS information 108.

Described embodiments provide techniques to pause the formation of consistency groups for a consistency session to allow a customer to create additional copies 4d, 4e of the synchronized copy of the first data copy 4a as of the point-in-time of the last formed consistency group for testing or other purposes.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The computational components of FIG. 1, including the controller 8a, 8b, 8c, copy managers 12a, 12b, and hosts 10a, 10b may be implemented in one or more computer systems, such as the computer system 302 shown in FIG. 6. Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 302 is shown in the form of a general-purpose computing device. The components of computer system/server 302 may include, but are not limited to, one or more processors or processing units 304, a system memory 306, and a bus 308 that couples various system components including system memory 306 to processor 304. Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 316 which generally carry out the functions and/or methodologies of embodiments of the invention as described herein. The controllers 8a, 8b, 8c may be implemented in one or more computer systems 302, where if they are implemented in multiple computer systems 302, then the computer systems may communicate over a network.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer implemented method, comprising:
   initiating a first copy operation to copy source data from a first storage to a first data copy in a second storage;
   initiating a second copy operation to copy the first data copy in the second storage to a second data copy in response to forming a consistency group of the source data at the first data copy consistent as of a point-in-time with respect to the source data;
   suspending the first copy operation to allow for further processing of the first data copy in response to completing the second copy operation; and
   restarting the formation of a next consistency group between the source data and the first data copy in response to receiving a resume command.

2. The method of claim 1, wherein the first copy operation continually forms consistency groups for a consistency session of the source data at the first data copy, wherein the second copy operation comprises a point-in-time copy operation in which the copy operation is completed by establishing data structures for the second copy operation and without copying all the data in the first data copy to the second data copy.

3. The method of claim 1, further comprising:
   receiving from a host a pause with consistency command, wherein the suspending of the first copy operation is performed in response to receiving the pause with consistency command and completing the second copy operation; and
   receiving a resume command from the host that sent the pause with consistency command, wherein the formation of the next consistency group is restarted in response to receiving the resume command.

4. The method of claim 1, wherein at least one additional data copy is formed from the first data copy during the suspending of the first copy operation, wherein the first data copy, the second data copy, and the at least one additional data copy are consistent as of the point-in-time at which the first data copy is consistent with the source data.

5. The method of claim 1, further comprising:
   maintaining first information indicating updates to the source storage for the consistency point that have not been copied to the first data copy, wherein the second copy operation is initiated when the first information indicates that all data as of the consistency point has been copied to the first data copy;
   maintaining second information indicating updates to the source storage received while the data indicated in the first information is being copied from the source data to the first data copy;
   in response to completing the second copy operation, updating the first information to indicate the updates indicated in the second information; and
   restarting the first copy operation to copy the updates indicated in the first information in response to updating the first information with the updates indicated in the second information.

6. The method of claim 5, further comprising:
   indicating updates to the source storage in the first information while the first copy operation is suspended.

7. The method of claim 1, further comprising:
   determining whether a pause flag has been set to indicate pause in response to determining that the first data copy has reached a consistency point as of a point-in-time with respect to the source data and that the second copy operation has completed, wherein the suspending the first copying is initiated in response to determining that the pause flag is set to indicate pause.

8. The method of claim 7, further comprising:
   receiving a pause with consistency command while performing the first or the second copy operation;
   setting the pause flag to indicate pause in response to receiving the pause with consistency command; and
   setting the pause flag to indicate no pause in response to receiving a resume command.

* * * * *